United States Patent
Oldynski et al.

(10) Patent No.: US 9,125,284 B2
(45) Date of Patent: *Sep. 1, 2015

(54) AUTOMATICALLY BALANCED MICRO-PULSED IONIZING BLOWER

(71) Applicant: Illinois Tool Works Inc., Glenview, IL (US)

(72) Inventors: Edward Oldynski, Martinez, CA (US); Peter Gefter, South San Francisco, CA (US); Leslie Partridge, San Jose, CA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/220,130

(22) Filed: Mar. 19, 2014

(65) Prior Publication Data

US 2014/0293496 A1    Oct. 2, 2014

Related U.S. Application Data

(63) Continuation-in-part of application No. 13/367,369, filed on Feb. 6, 2012, now Pat. No. 8,773,837.

(51) Int. Cl.
| | |
|---|---|
| H01T 23/00 | (2006.01) |
| H05F 3/06 | (2006.01) |
| B03C 3/68 | (2006.01) |
| B01D 53/32 | (2006.01) |
| H01T 19/00 | (2006.01) |

(52) U.S. Cl.
CPC *H05F 3/06* (2013.01); *B01D 53/32* (2013.01); *B03C 3/68* (2013.01); *H01T 23/00* (2013.01); *B01D 2259/818* (2013.01); *H01T 19/00* (2013.01)

(58) Field of Classification Search
USPC .................................................. 361/230
See application file for complete search history.

(56) References Cited

U.S. PATENT DOCUMENTS

| | | | |
|---|---|---|---|
| 3,875,035 | A | 4/1975 | Lowther |
| 4,138,233 | A | 2/1979 | Masuda |

(Continued)

FOREIGN PATENT DOCUMENTS

| | | |
|---|---|---|
| CN | 2418879 | 2/2001 |
| CN | 101207964 | 6/2008 |

(Continued)

OTHER PUBLICATIONS

Office Action mailed Dec. 7, 2011 for U.S. Appl. No. 12/456,526.

(Continued)

*Primary Examiner* — Dharti Patel
(74) *Attorney, Agent, or Firm* — Stephen Uriarte

(57) ABSTRACT

In one embodiment of the invention, a method of automatically balancing ionized air stream created in bipolar corona discharge is provided. The method comprises: providing an air moving device with at least one ion emitter and reference electrode connected to a micro-pulsed AC power source, and a control system with at least one ion balance monitor and corona discharge adjustment control; generating variable polarity groups of short duration ionizing micro-pulses: wherein said micro-pulses are predominantly asymmetric in amplitude and duration of both polarity voltages and have a magnitude of at least one polarity ionizing pulses exceed the corona threshold.

21 Claims, 10 Drawing Sheets

(56) References Cited

U.S. PATENT DOCUMENTS

| | | | |
|---|---|---|---|
| 4,271,451 A | 6/1981 | Metz | |
| 4,417,293 A | 11/1983 | Larigaldie | |
| 4,442,356 A | 4/1984 | Ludwick et al. | |
| 4,689,715 A | 8/1987 | Halleck et al. | |
| 4,781,736 A | 11/1988 | Cheney et al. | |
| 4,878,149 A | 10/1989 | Stiehl et al. | |
| 4,901,194 A | 2/1990 | Steinman et al. | |
| 4,974,115 A | 11/1990 | Breidegam et al. | |
| 5,005,101 A | 4/1991 | Gallagher | |
| 5,047,892 A | 9/1991 | Sakata et al. | |
| 5,055,963 A | 10/1991 | Partridge | |
| 5,095,400 A | 3/1992 | Saito | |
| 5,116,583 A | 5/1992 | Batchelder et al. | |
| 5,153,811 A | 10/1992 | Rodrigo et al. | |
| 5,249,094 A | 9/1993 | Hayakawa et al. | |
| 5,388,769 A | 2/1995 | Rodrigo et al. | |
| 5,447,763 A | 9/1995 | Gehlke | |
| 5,535,089 A | 7/1996 | Ford et al. | |
| 5,550,703 A | 8/1996 | Beyer et al. | |
| 5,630,949 A | 5/1997 | Lakin | |
| 5,847,917 A | 12/1998 | Suzuki | |
| 6,145,391 A | 11/2000 | Pui et al. | |
| 6,252,233 B1 * | 6/2001 | Good | 250/423 R |
| 6,259,591 B1 | 7/2001 | Pitel et al. | |
| 6,330,146 B1 | 12/2001 | Blitshteyn et al. | |
| 6,504,700 B1 | 1/2003 | Hahne et al. | |
| 6,636,411 B1 | 10/2003 | Noll | |
| 6,653,638 B2 | 11/2003 | Fujii | |
| 6,671,161 B2 | 12/2003 | Nilsson | |
| 6,693,788 B1 | 2/2004 | Partridge | |
| 6,807,044 B1 | 10/2004 | Vernitsky et al. | |
| 6,826,030 B2 | 11/2004 | Gorczyca et al. | |
| 6,850,403 B1 * | 2/2005 | Gefter et al. | 361/230 |
| 7,031,133 B2 | 4/2006 | Riebel et al. | |
| 7,057,130 B2 | 6/2006 | Gefter et al. | |
| 7,126,092 B2 | 10/2006 | Lin et al. | |
| 7,177,133 B2 | 2/2007 | Riskin | |
| 7,180,722 B2 | 2/2007 | Jacobs et al. | |
| D550,340 S | 9/2007 | Sato et al. | |
| 7,339,778 B1 | 3/2008 | Gefter et al. | |
| 7,375,944 B2 | 5/2008 | Izaki et al. | |
| 7,479,615 B2 | 1/2009 | Gefter et al. | |
| 7,649,728 B2 | 1/2010 | Fujita et al. | |
| 7,679,026 B1 | 3/2010 | Gefter et al. | |
| 7,751,695 B2 | 7/2010 | Decker | |
| 7,813,102 B2 | 10/2010 | Gefter et al. | |
| 7,821,762 B2 | 10/2010 | Yasuoka et al. | |
| 7,822,355 B2 | 10/2010 | Schlitz | |
| D636,840 S | 4/2011 | Yasuoka et al. | |
| D636,841 S | 4/2011 | Yasuoka et al. | |
| D639,898 S | 6/2011 | Yasuoka et al. | |
| D643,091 S | 8/2011 | Yasuoka et al. | |
| 8,009,405 B2 | 8/2011 | Gefter et al. | |
| 8,038,775 B2 | 10/2011 | Gefter | |
| 8,048,200 B2 | 11/2011 | Gefter et al. | |
| 8,063,336 B2 | 11/2011 | Gefter et al. | |
| 8,174,814 B2 | 5/2012 | Yasuoka et al. | |
| 8,773,837 B2 | 7/2014 | Partridge et al. | |
| 8,885,317 B2 | 11/2014 | Partridge | |
| 2002/0125423 A1 | 9/2002 | Ebeling et al. | |
| 2003/0007307 A1 | 1/2003 | Lee et al. | |
| 2003/0011957 A1 | 1/2003 | Nilsson | |
| 2004/0130271 A1 | 7/2004 | Sekoguchi et al. | |
| 2005/0052815 A1 | 3/2005 | Fujiwara et al. | |
| 2005/0083633 A1 | 4/2005 | Riebel et al. | |
| 2005/0116167 A1 | 6/2005 | Izaki et al. | |
| 2005/0225922 A1 | 10/2005 | Gefter et al. | |
| 2005/0236375 A1 | 10/2005 | Gefter et al. | |
| 2006/0018811 A1 | 1/2006 | Taylor et al. | |
| 2006/0021508 A1 | 2/2006 | Kwon et al. | |
| 2006/0071599 A1 | 4/2006 | Curtis et al. | |
| 2006/0232908 A1 | 10/2006 | Izumi et al. | |
| 2007/0279829 A1 | 12/2007 | Gefter et al. | |
| 2008/0151465 A1 | 6/2008 | Fujita et al. | |
| 2008/0199208 A1 | 8/2008 | Schlitz | |
| 2008/0225460 A1 | 9/2008 | Gefter et al. | |
| 2008/0232021 A1 | 9/2008 | Gefter et al. | |
| 2009/0316325 A1 | 12/2009 | Gefter | |
| 2011/0139889 A1 | 6/2011 | Ohtsuka et al. | |
| 2011/0299214 A1 | 12/2011 | Gefter et al. | |
| 2012/0200982 A1 | 8/2012 | Partridge | |
| 2012/0224293 A1 | 9/2012 | Partridge et al. | |

FOREIGN PATENT DOCUMENTS

| | | |
|---|---|---|
| EP | 0 386 317 | 9/1990 |
| EP | 0 386 318 A1 | 9/1990 |
| EP | 0386318 (A1) | 9/1990 |
| EP | 0386318 (B1) | 7/1994 |
| EP | 1142455 | 11/2003 |
| EP | 1 547 693 A1 | 6/2005 |
| EP | 1 547 693 B1 | 5/2012 |
| FR | 2 466 886 | 4/1981 |
| JP | 61-74639 | 4/1988 |
| JP | S63-143954 | 6/1988 |
| JP | 2005-328904 | 3/1989 |
| JP | H03-230499 | 3/1989 |
| JP | H03-230499 | 10/1991 |
| JP | H0435958 (Y2) | 8/1992 |
| JP | 5047490 | 2/1993 |
| JP | H06-275366 | 9/1994 |
| JP | 7249497 | 9/1995 |
| JP | 2520311 (B2) | 7/1996 |
| JP | 10055896 | 2/1998 |
| JP | H10-156213 | 6/1998 |
| JP | 11273893 | 9/1999 |
| JP | 2000-058290 | 2/2000 |
| JP | 2000-133413 | 5/2000 |
| JP | 2001-085189 | 3/2001 |
| JP | 2002-025748 | 1/2002 |
| JP | 2002216994 | 9/2002 |
| JP | 3401702 (B2) | 4/2003 |
| JP | 3536560 (B2) | 6/2004 |
| JP | 2005-216539 | 8/2005 |
| JP | 2006-12520 | 1/2006 |
| JP | 2006-092866 | 4/2006 |
| JP | 2006-196378 | 7/2006 |
| JP | 2008-124035 (A) | 5/2008 |
| JP | 200939893 | 9/2009 |
| JP | 4465232 (B2) | 5/2010 |
| JP | 5046390 (B2) | 10/2012 |
| JP | I384905 | 2/2013 |
| TW | 200939893 | 9/2009 |
| WO | WO 00/38484 | 6/2000 |
| WO | WO 2005/102582 | 11/2000 |
| WO | WO 03/049509 | 6/2003 |
| WO | WO 03100932 | 12/2003 |
| WO | WO 2008/115884 | 9/2008 |
| WO | WO 2013/103368 A1 | 7/2013 |

OTHER PUBLICATIONS

Office Action mailed Jul. 5, 2012 for U.S. Appl. No. 12/456,526.
Applicant-initiated Interview summary mailed Oct. 5, 2012 for U.S. Appl. No. 12/456,526.
Advisory Action mailed Oct. 5, 2012 for U.S. Appl. No. 12/456,526.
Notice of allowability mailed Dec. 16, 2013 for U.S. Appl. No. 13/367,369.
Office Action mailed Jun. 12, 2013 for U.S. Appl. No. 13/367,369.
Office Action mailed Feb. 2, 2013 for U.S. Appl. No. 13/367,369.
Office Action mailed Jun. 10, 2010 for U.S. Appl. No. 11/398,446.
International search report, international preliminary report on patentability, and written opinion mailed Jul. 23, 2008 for PCT application PCT/US2007/065767.
Office Action mailed Jan. 28, 2010 for U.S. Appl. No. 11/398,446.
Notice Allowance mailed Oct. 28, 2009 for U.S. Appl. No. 11/623,316.
Office Action mailed Jul. 22, 2009 for U.S. Appl. No. 11/623,316.
Office Action mailed Oct. 30, 2008 for U.S. Appl. No. 11/623,316.
Notice of Allowance for U.S. Appl. No. 13/023,397, mailed on Jul. 18, 2014.
Notice of Allowance for U.S. Appl. No. 12/075,967, mailed on Aug. 16, 2010.

(56) References Cited

OTHER PUBLICATIONS

Notice of Allowance for U.S. Appl. No. 12/075,967, mailed on Jun. 3, 2010.
Notice of Allowance for U.S. Appl. No. 12/075,967, mailed on Mar. 9, 2010.
Notice of Allowance for U.S. Appl. No. 13/367,369, mailed on May 9, 2014.
Notice of Allowance for U.S. Appl. No. 13/023,397, mailed on Mar. 17, 2014.
Notice of Allowability mailed Dec. 1, 2005 for U.S. Appl. No. 10/821,773.
Office Action mailed Aug. 11, 2005 for U.S. Appl. No. 10/821,773.
Office Action mailed Mar. 10, 2005 for U.S. Appl. No. 10/821,773.
Notice of Allowability mailed Sep. 22, 2008 for U.S. Appl. No. 11/136,754.
Office Action mailed Apr. 30, 2008 for U.S. Appl. No. 11/136,754.
Office Action mailed Jun. 1, 2007 for U.S. Appl. No. 11/136,754.
Office Action mailed Mar. 28, 2007 for U.S. Appl. No. 11/136,754.
Notice of Allowability mailed Jul. 12 2011 for U.S. Appl. No. 11/398,446.
Interview Summary mailed Mar. 9, 2011 for U.S. Appl. No. 11/398,446.
Office Action mailed Dec. 13, 2010 for U.S. Appl. No. 11/398,446.
Notification of transmittal of the Int'l Search Report and the written opinion of the ISA, & ISR & Written Opinion of ISA (mailed May 7, 2012) for PCT/US2012/024095.
Office Action mailed Mar. 11, 2014 for U.S. Appl. No. 12/456,526.
Notification of Transmittal of the ISR and the Written Opinion (mailed Feb. 19, 2013) for PCT/US2012/064045.
International Search Report and Written Opinion of the ISR (Feb. 19, 2013) for PCT/US2012/064045.
Notification of Transmittal of International Search Report and Written Opinion of the ISA, and International Search Report for PCT/US2008/03488 (Jun. 9, 2009).
International Preliminary Report on Patentability and Written Opinion of the ISA for PCT/US2008/03488 (Jun. 9, 2009).
Written Opinion of the ISA for PCT/US2008/03488 (Jun. 9, 2009).
International Preliminary Report on Patentability and Written Opinion of the ISA for PCT/US2012/024095 (Jul. 5, 2012).
International Search Report for PCT/US2012/024095 (Aug. 16, 2012).
Written Opinion of the ISA for PCT/US2012/024095 (Aug. 13, 2013).
Written Opinion of the ISA (Sep. 17, 2009), and International Search Report (mailed Sep. 25, 2008) for PCT/US2008/057262.
Office Action mailed on Aug. 2, 2012 for U.S. Appl. No. 13/210,267.
Office Action mailed Nov. 21, 2012 for U.S. Appl. No. 13/210,267.
Office Action mailed Aug. 3, 2010 for U.S. Appl. No. 12/049,350.
Office Action mailed Jan. 4, 2011 for U.S. Appl. No. 12/049,350.
International Preliminary Report on Patentability and Written Opinion for PCT/US05/09093, Jul. 28, 2005.
International Search Report for PCT/US05/09093, Jul. 28, 2005.
Office Action (Advisory Action) mailed Apr. 11, 2013 for U.S. Appl. No. 13/210,267.
Office Action mailed Jan. 4, 2011 for U.S. Appl. No. 13/023,397.
PCT Application PCT/US2012/033278, Notification of Trans . . . , International Search Report and Written Opinion of the International Searching Authority, mailed Sep. 14, 2012.
PCT/US08/03488 International Search Report; ISA/US; Jun. 9, 2009.
Webpages from LIROS website, pages, date unknown, available online at http ://www.liroselectronic.com and http://www.liroselectronic.com/documents/NoStatic-2009_eng.pdf.
Search Report for Taiwan Invention Patent Application No. 101103565, dated Dec. 16, 2013.
Office Action for U.S. Appl. No. 13/023,397, mailed on Jul. 19, 2013.
Office Action dated Mar. 2, 2015 for U.S. Appl. No. 29/443,821.
Notification of transmittal of the ISR and the written opinion of the ISA, or the declaration, Accompaying ISR and written opinion of the ISA, mailed Apr. 10, 2015.

\* cited by examiner

AUTOMATICALLY BALANCED MICRO-PULSED IONIZING BLOWER

CROSS-REFERENCE TO RELATED APPLICATIONS

This application is a continuation-in-part of U.S. application Ser. No. 13/367,369, filed 6 Feb. 2012. U.S. application Ser. No. 13/367,369 is hereby fully incorporated herein by reference.

BACKGROUND OF THE INVENTION

1. Technical Field

Embodiment of the invention generally relates to ionizing blowers.

2. Background Art

Static charge neutralizers are designed to remove or minimize static charge accumulation. Static charge neutralizers remove static charge by generating air ions and delivering those ions to a charged target.

One specific category of static charge neutralizers is the ionizing blower. An ionizing blower normally generates air ions with a corona electrode, and uses a fan (or fans) to direct air ions toward the target of interest.

Monitoring or controlling the performance of a blower utilizes two measurements.

The first measurement is balance. Ideal balance occurs when the number of positive air ions equals the number of negative air ions. On a charge plate monitor, the ideal reading is zero. In practice, the static neutralizer is controlled within a small range around zero. For example, a static neutralizer's balance might be specified as approximately ±0.2 volts.

The second measurement is air ion current. Higher air ion currents are useful because static charges can be discharged in a shorter time period. Higher air ion currents correlate with low discharge times that are measured with a charge plate monitor.

BRIEF SUMMARY

In an embodiment of the invention, a method of automatically balancing ionized air stream created in bipolar corona discharge is provided. The method comprises: providing an air moving device with at least one ion emitter and reference electrode connected to a micro-pulsed AC power source, and a control system with at least one ion balance monitor and corona discharge adjustment control; generating variable polarity groups of: short duration ionizing micro-pulses: wherein said micro-pulses are predominantly asymmetric in amplitude and duration of both polarity voltages and have a magnitude of at least one polarity ionizing pulses exceed the corona threshold.

In another embodiment of the invention, an apparatus for an automatically balanced ionizing blower is provided. The apparatus comprises: an air moving device and at least one ion emitter and reference electrode both connected to a high voltage source; and an ion balance monitor; wherein a transformer of said high voltage source, said ion emitter and reference electrode arranged in a closed loop for AC current circuit and said loop connected to ground a high value viewing resistor.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having benefit of the herein disclosure.

An embodiment of the present invention can apply to many types of air-gas ionizers configured as, for example, ionizing bars, blowers, or in-line ionization devices.

Figure 1A:
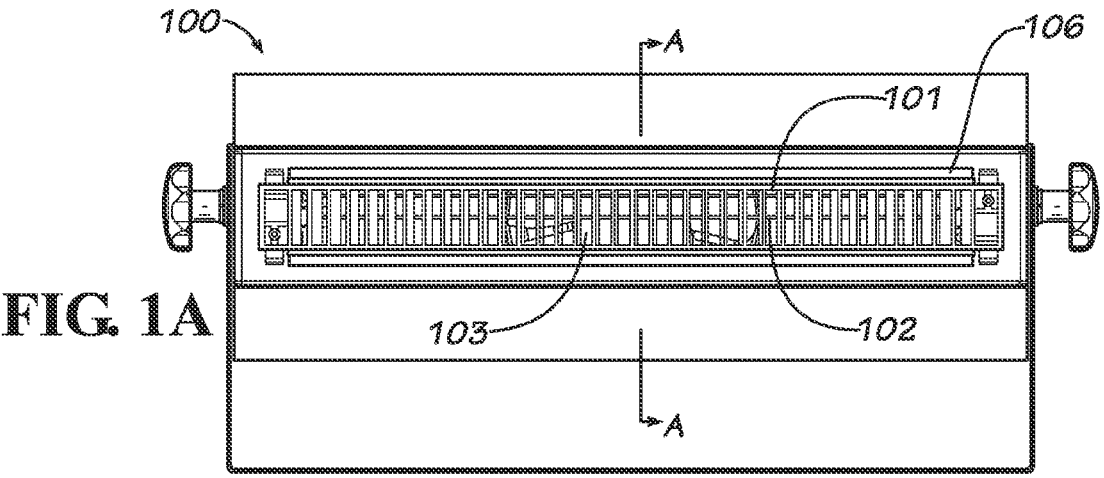
FIG. 1A is a block diagram of a general view of an ionizing blower, in accordance with an embodiment of the invention.
Figure 1B:
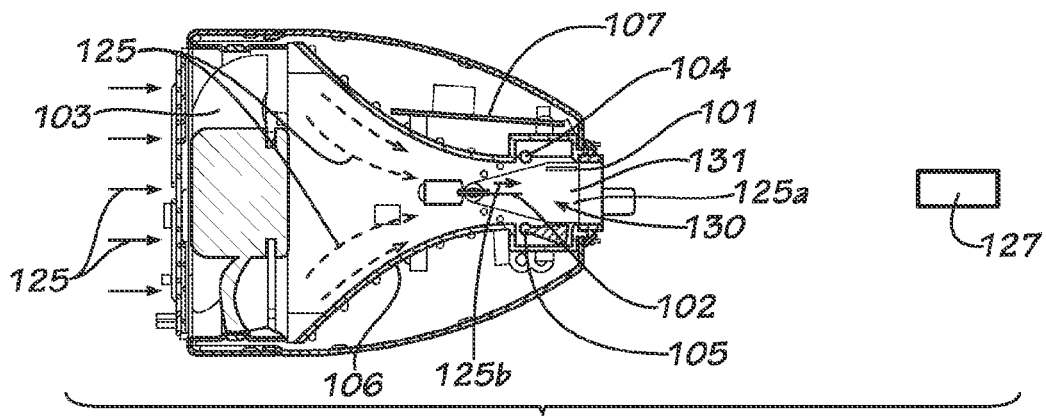
FIG. 1B is a cross sectional view of the blower of FIG. 1A.

Wide area coverage ionizing blowers requires combination of highly efficient air ionization with short discharge time and tight ion balance control. FIG. 1A is a block diagram of a general view of an ionizing blower 100, in accordance with an embodiment of the invention, while FIG. 1B is a cross sectional view of the blower 100 of FIG. 1A along the line A-A. The efficient air ionization is achieved by the bipolar corona discharge created between the array of emitter points 102 (i.e., emitter points array 102) and two reference electrodes 104, 105 (shown as upper reference electrode 104 and lower reference electrode 105). The emitter points 102 mounted on a protective grill 106 (i.e., air duct 106) which also helps equally to speed an ionized air flow.

A fan 103 (FIG. 1A) is an air moving device that provides a high variable air flow 125 in a space 130 between the emitter points array 102 (ion emitter(s) 102) and the two reference electrodes 104, 105. The air duct 106 concentrates and distributes air flow 125 in the space 130 of a corona discharge. Corona generated positive and negative ions are moving between electrodes 102, 104 and 105. The air flow 125 is able to take and carry only a relatively small portion of positive and negative ions created by the corona discharge.

Figure 1C:
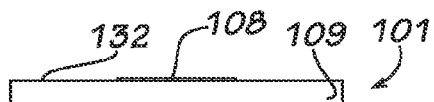
FIG. 1C is a block diagram of a sensor included in an ionizing blower, in accordance with an embodiment of the invention.

According to one embodiment of the invention, the air 125 is forced out of the air duct (106) outlet 131 and the air 125 passes an air ionization sensor 101. Details one embodiment of a design of the sensor 101 are shown in FIG. 1C. A fan (shown as block 126 in FIG. 1B) provides the flow of air 125. The air ionization voltage sensor 101 has a louver type thin dielectric plate 109 stretched on full width of the duct 106. The louver plate 109 directs a portion 125a (or sample 125a) of the ionized air flow 125b (ionized air stream 125b) coming from the duct 106 and upper electrode 104 (see also FIG. 2A), so that the sensor 101 can sense and collect some of the ion charges in the portion 125a of the ionized air flow 125b. The collected ion charges then creates the control Signal 250 (FIG. 2) for use by the algorithm 300 (FIG. 3) for balancing the ions in the ionizing blower 100. A top side 132 of the plate 109 has a narrow metal strip functioning as a sensitive electrode 108 and a bottom side 133 has wider grounded plain electrode 110. This electrode 110 is typically shielded so that the air ionization sensor 101 is shielded from the high electrical field of the emitter points array 102. The electrode 108 collects some of the ion's charges resulting in a voltage/signal 135 (FIG. 2A) that is proportional to ion balance in the ionized air flow 125b. The voltage/signal 135 from sensor 101 used by the control system 107 (shown in FIG. 2 as system 200) to monitor and adjust the ion balance in the ionized air flow 125b. This signal 135 is also represented by the signal 250 which is input into the sample and hold circuit 205 as will be discussed further below. Other configurations of ion balance sensors, for example, in the form of conductive grille or metal mesh immersed in the ion flow also can be used in other embodiments of the invention.

According to another embodiment of the invention, an ion current sensor 204 is used to monitor ionized flow balance. Therefore, one embodiment of the invention provides a system 200 (FIG. 2) comprising the ionization return current sensor 204 for monitoring the ionized air flow balance. In another embodiment of the invention, the system 200 comprises the air ionization voltage sensor 101 for monitoring the ionized air flow balance.

In yet another embodiment of the invention, the system 200 comprises the dual sensors comprising the air ionization voltage sensor 101 and ionization current return sensor 204, with both sensors 101 and 204 configured for monitoring the ionized air flow balance.

The ionization return current sensor 204 includes the capacitor C2 and capacitor C1, and resistors R1 and R2. The capacitor C2 provides an AC current path to ground, bypassing the current detect circuit. The resistor R2 converts the Ion current to a voltage (Ii*R2), and the resistors R1 and R2 and capacitor C2 form a low pass filter to filter out induced currents created by the micro pulse. The return current 210 flowing from the sensor 204 is shown as I2.

The current 254 flowing to the emitter points 102 is the current summation $\Sigma(Ii(+), Ii(-), I2, Ic1, Ic2)$ where the currents Ic1 and Ic2 are the currents flowing through the capacitors C1 and C2, respectively.

Figure 2A:
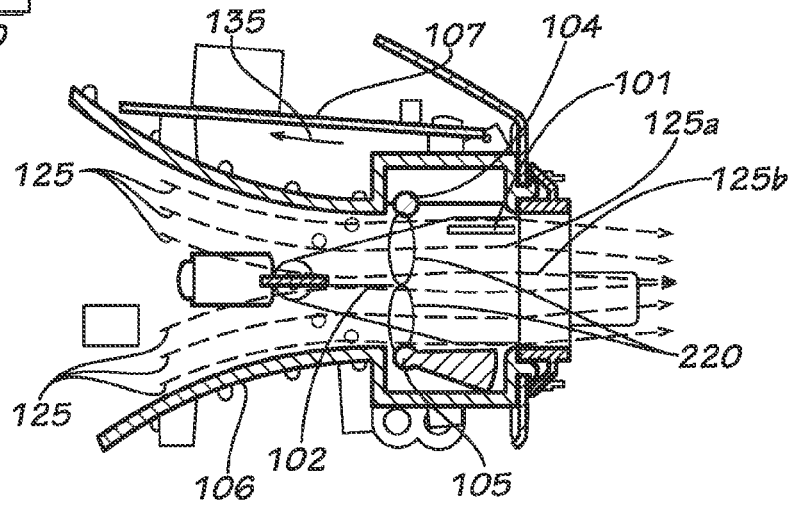
FIG. 2A is a block diagram of the ionizing blower of FIG. 1A and the ionized air stream from the blower, in accordance with an embodiment of the invention.

FIG. 2A illustrates ion currents 220 flowing between the emitters 102 and reference electrodes 104, 105. The air flow 125 from the duct 106 converts a portion of these two ion currents 220 in an ionized air flow 125b which is moving to a target of charge neutralization outside the blower 100. The target is generally shown in FIG. 1B as the block 127 which can be placed in different locations with respect to the ionizing blower 100.

Figure 2B:
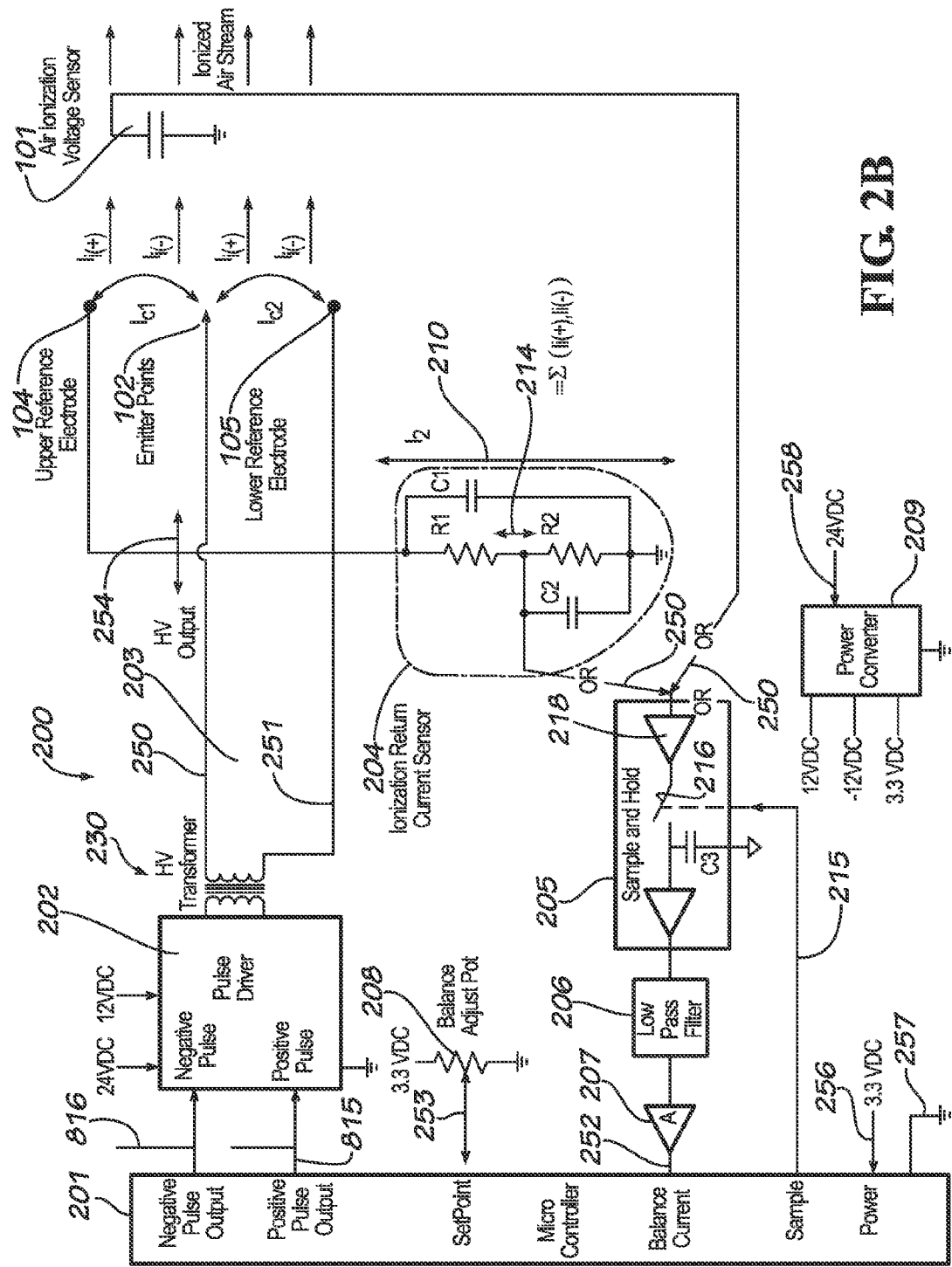
FIG. 2B is an electrical block diagram of a system in the ionizing blower, in accordance with an embodiment of the invention.

FIG. 2B shows an electrical block diagram of a system 200 in the ionizing blower 100, in accordance with an embodiment of the invention. The system 200 includes an Ion current sensor 204, micro-pulse high voltage power supply 230 (micro-pulsed AC power source 230) (which is formed by the pulse driver 202 and high voltage (HV) transformer 203), and a control system 201 of the Ionizing blower. In an embodiment, the control system 201 is a microcontroller 201. The microcontroller 201 receives a power from a voltage bias 256 which may be at, for example, about 3.3 DC voltage and is grounded at line 257.

A power converter 209 may be optionally used in the system 200 to provide various voltages (e.g. −12 VDC, 12 VDC, or 3.3 VDC) that is used by the system 200. The power converter 209 may convert a voltage source value 258 (e.g., 24 VDC) into various voltages 256 for biasing the microcontroller 201.

The micro-pulse high voltage power supply 230 has a pulse driver 202 controlled by Micro-Controller 201. The pulse driver 202 is connected to a step up pulse transformer 203. The transformer 203 generates short duration pulses (in microsecond range) positive and negative polarities having amplitudes sufficient to produce corona discharge. The secondary coil of the transformer 203 is floated relatively to ground. A high voltage terminal 250 of transformer 203 is connected to the emitter points array 102 and a low voltage terminal 251 of transformer 203 is connected to the reference electrodes 104, 105.

The short duration high voltage AC pulses (generated by the high voltage power supply 230) result in significant capacitive or displacement currents Ic1 and Ic2 flowing between electrodes 102 and 104, 105. For example, the current Ic1 flows between the electrodes (emitter points) 102 and the upper reference electrode 104, and the current Ic2 flows between the electrodes 102 and the lower reference electrode 105. Relatively small positive and negative ion corona currents marked as Ii(+) and Ii(−) leave this ions generation system 200 into the environment outside blower 100 and moving to the target.

To separate the capacitive and ion currents, the ion generating system 200 is arranged in a closed loop circuit for high frequency AC capacitive currents marked Ic1 and Ic2 as the secondary coil of transformer 203 and corona electrodes 102, 104 and 105 are virtually floated relative to ground and the ion currents Ii(+) and Ii(−) have a return path (and transmits) to ground. AC currents have significantly lower resistance to circulate inside this loop than these AC currents transmitting to ground.

The system 200 includes the ion balance monitor providing separation ions convection currents from pulsed AC currents by arranging closed loop current path between the pulsed AC voltage source 230, said ion emitter 102 and reference electrode 104 or 105.

Additionally, ion balance monitoring is performed in the system 200 during time periods between the micro-pulses. Additionally, ion balance monitoring is performed by integrating differential signals of the positive and negative convection currents.

The transformer 203 of the high voltage source 230, the ion emitter 102 and reference electrode 104 or 105 are arranged in a closed loop for AC current circuit and the closed loop is connected to ground by a high value viewing resistor R2.

The law of charge conservation dictates that as the output (via transformer 203) of AC voltage source 230 is floated, the ion current is equal to a sum of positive Ii(+) and negative Ii(−) ion currents. These currents Ii(+) and Ii(−) have to return through the circuitry of the return current sensor 204 in the system 200. The amount of each polarity ion current are:

$$Ii(+)=Q(+)*N(+)*U \text{ and } Ii(-)=Q(-)*N(-)\cdot*U$$

Where Q is charge of positive or negative ion, N is ion concentration, and U is air flow. An ion balance will be achieved if absolute values of positive Ii(+) and negative Ii(−) currents are the same. It is known in the art that both polarities of air ions carry about the same amount of charge (equal to one electron). So, another condition of ion balance is equal concentrations of both polarity ions. The air ionization voltage sensor 101 (ion balance monitor 101) is more sensitive to variation in the ion concentration, in contrast to the return current sensor 204 (ion balance monitor 204) which is sensitive to ion currents changes. Therefore, the speed of the response of the air ionization voltage sensor (capacitor sensor) 101 is typically faster than the response of the ionization return current sensor 204.

A greater number of positive ions detected by the sensor 101 results in the sensor 101 generating a positive output voltage that is input into (and processed by) the sample and hold circuit 205. A greater number of negative ions detected by the sensor 101 results in the sensor 101 generating a negative output voltage that is input into (and processed by) the sample and hold circuit 205. In contrast, as similarly described above, absolute values of positive Ii(+) and negative Ii(−) are used by the sensor 204 to output the signal 250 for input into the sample and hold circuit 205 to determine and achieve an ion balance in the ionization blower 100.

At the time between a micropulse train, the sample signal 215 will close the switch 216 so that amplifier 218 is connected to the capacitor C3 which is then charged to a value based in response to the input signal 250.

The ion currents floated with air stream are characterized by very low frequency and can be monitored by passing through a high mega ohm resistive circuitry R1 and R2 to ground. To minimize the influence of capacitive and parasitic high frequency currents, the sensor 204 has two bypass capacitive paths with C1 and C2.

The difference in currents Ii(+) and Ii(−) are continuously measured by sensor 204. The resulting current passing though resistive circuitry R1, R2 produces a voltage/signal proportional to integrated/averaged in time ion balance of the air stream that left the blower. This resulting current is shown as current 214 which is expressed by the summation $\Sigma$(Ii(+), Ii(−)).

The ion balance monitoring is achieved by measuring voltage output of current sensor 204, or by measuring output of voltage sensor 101, or by measuring voltage from an air ionization sensor 101 and 204. For purposes of clarity, the voltage outputs of the current sensor 204 and voltage output of voltage sensor 101 are each shown in FIG. 2 by the same signal 250. This signal 250 is applied to the input of a sample and hold circuit 205 (sampling circuit 205) that is controlled by the Microcontroller 201 via the sample signal 215 which opens the switch 216 to trigger a sample and hold operation on the signal 250.

In some cases or embodiments for corona system, diagnostic signals from both sensors 101 and 204 can be compared. These diagnostic signals are input as signal 250 into the sample and hold circuit 205.

The signal 250 is then conditioned by a low pass filter 206 and amplified by the amplifier 207 before being applied to the input of the Analog to Digital Converter (ADC) residing inside the Microcontroller 201. The sample and hold circuit 205 samples the signal 250 between pulses times to minimize noise in the recovered signal 250. Capacitor C3 holds the last signal value in-between sample times. Amplifier 207 amplifies the signal 250 to a more usable level for the microcontroller 201, and this amplified signal from the amplifier 207 is shown as the balance signal 252.

The microcontroller 201 compares the balance signal 252 with a setpoint signal 253 which is a reference signal generated by the balance adjustment potentiometer 208. The setpoint signal 253 is a variable signal that can be adjusted by the potentiometer 208.

The setpoint signal 253 can be adjusted in order to compensate for different environments of the ionizing blower 100. For example, the reference level (ground) near the output 131 (FIG. 1B) of the ionizing blower 100 may be approximately zero, while the reference level near an ionization target may not be zero. For example, more negative ions might be lost at the location of the ionization target if the location has a strong ground potential value. Therefore, the setpoint signal 253 may be adjusted so as to compensate for the non-zero value of the reference level at a location of the ionization target. The setpoint signal 253 can be decreased in this case so that the microcontroller 201 can drive the pulse driver 202 to control the HV transformer 230 to generate an HV output 254 that generates more positive ions at the emitter points 102 (due to the lower setpoint value 253 used as a comparison for trigger more positive ions generation) so as to compensate for the loss of negative ions at the location of the ionization target.

Figure 8:
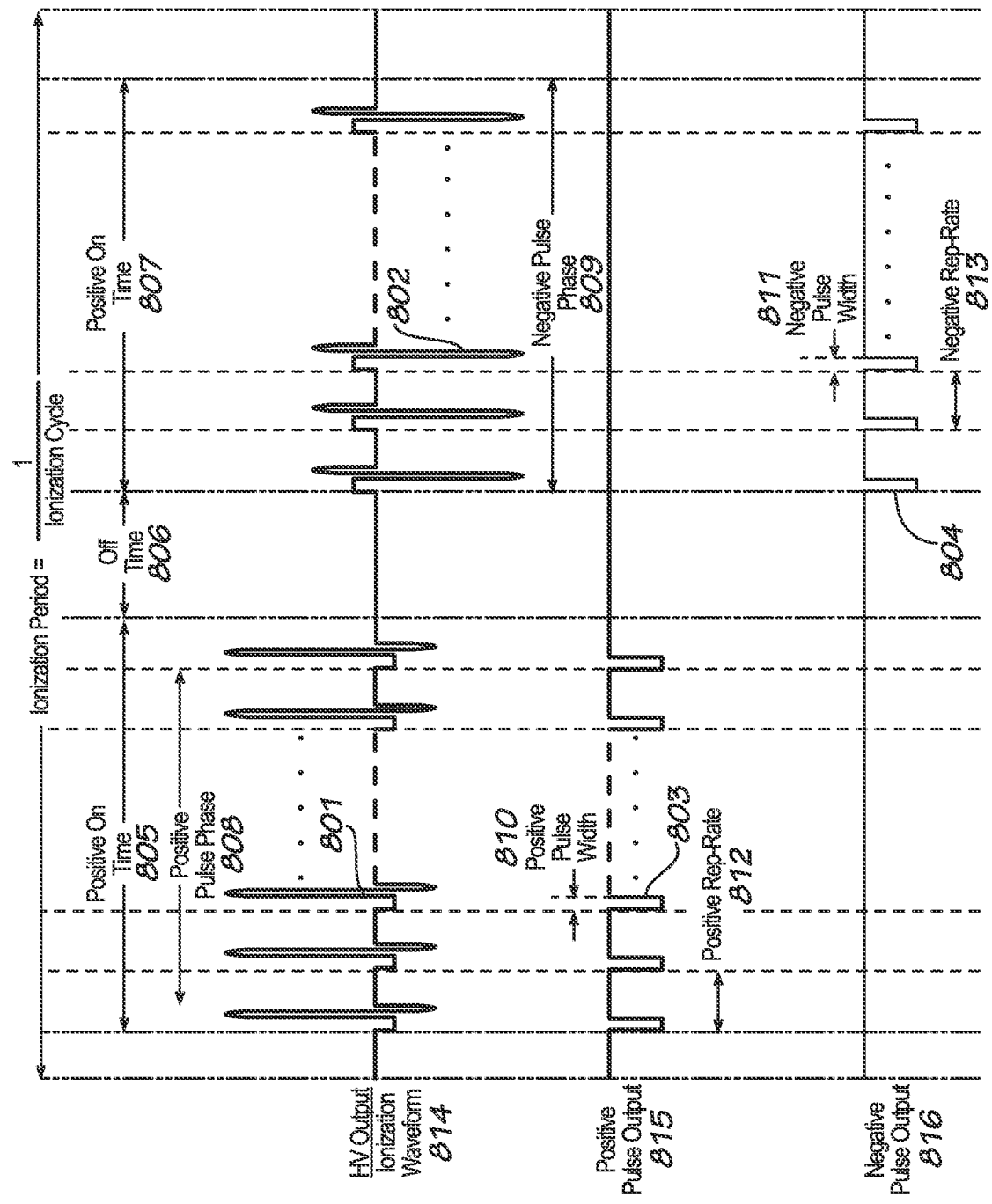
FIG. 8 are waveform diagrams of micropulses, in accordance with an embodiment of the invention.

Reference is now made to FIGS. 2 and 8. In an embodiment of the invention, the ionization blower 100 can achieve an ion balance in the ionizing blower 100 based on at least one or more of the following: (1) by increasing and/or decreasing the positive pulse width value and/or negative pulse width value, (2) by increasing and/or decreasing the time between positive pulses and/or time between negative pulses, and/or (3) by increasing and/or decreasing the number positive pulses and/or negative pulses, as described below. The microcontroller 201 outputs the positive pulse output 815 and negative pulse output 816 (FIGS. 2 and 8) which are driven into and controls the pulse driver 202. In response to the outputs 815 and 816, the transformer 230 generates the ionization waveform 814 (HV output 814) that is applied to the emitter points 102 so as to generate an amount of positive ions and an amount of negative ions based on the ionization waveform 814.

As an example, if the sensor 101 and/or sensor 204 detects an ion imbalance in the ionizing blower 101 where the amount positive ions exceeds the amount of negative ions in the blower 101, the balance signal 252 into the microcontroller 201 will indicate this ion imbalance. The microcontroller 201 will lengthen the negative pulse width (duration) 811 of negative pulses 804. Since the width 811 is lengthened, the amplitude of the negative micropulses 802 is increased. The positive micropulses 801 and negative micropulses 802 are high voltages output that are driven to the emitter points 102. The increased amplitude of the negative micropulses 802 will increase the negative ions generated from the emitter points 102. The ionization waveform 814 has generated variable polarity groups of short duration ionizing micro-pulses 801 and 802. The micro-pulses 801 and 802 are predominant asymmetric in amplitude and duration of both polarity voltages and have a magnitude of at least one polarity ionizing pulses exceed the corona threshold.

Once the maximum pulse width has been reached for the negative pulse width 811, if the amount of positive ions is still exceeding the amount of negative ions in the blower 100, then the microcontroller 201 will shorten the positive pulse width (duration) 810 of positive pulses 803. Since the width 810 is shortened, the amplitude of the positive micropulses 801 is decreased. The decreased amplitude of the positive micropulses 801 will decrease the positive ions generated from the emitter points 102.

Alternatively or additionally, if the amount of positive ions exceeds the amount of negative ions in the blower 100, the microcontroller 201 will lengthen the time between negative pulses 804 by lengthening the negative Rep-Rate 813 (time interval between negative pulses 804). Since the negative Rep-Rate 813 is lengthened, the time between negative micropulses 802 is also increased. As a result, the lengthened or longer negative Rep-Rate 813 will increase the time between the negative micropulses 802 which will, in turn, increase the amount of time negative ions are generated from the emitter points 102.

Once the minimum negative Rep-Rate has been reached for the negative Rep-Rate, if the amount of positive ions is still exceeding the amount of negative ions in the blower 100, then the microcontroller 201 will shorten the time between positive pulses 803 by shortening the positive Rep-Rate 812 (time interval between positive pulses 803). Since the positive Rep-Rate 812 is shortened, the time between positive micropulses 801 is also decreased. As a result, the shortened or shorter positive Rep-Rate 811 will decrease the time between the positive micropulses 803 which will, in turn, decrease the amount of time positive ions generated from the emitter points 102.

Alternatively or additionally, if the amount of positive ions exceeds the amount of negative ions in the blower 100, the microcontroller 201 will increase the number of negative pulses 804 in the negative pulse output 816. The microcontroller 201 has a negative pulse counter that can be increased so as to increase the number of negative pulses 804 in the negative pulse output 816. Since the number of negative pulses 804 is increased, the negative pulse train is increased in the negative pulse output 816, and this increases the number of negative micropulses 802 in the HV output which is the ionization waveform 814 that is applied to the emitter points 102.

Once the maximum amount of negative pulses has been added to the negative pulse output 816, if the amount of positive ions is still exceeding the amount of negative ions in the blower 100, then the microcontroller 201 will decrease the number of positive pulses 803 in the positive pulse output 815. The microcontroller 201 has a positive pulse counter that can be decreased so as to decrease the number of positive pulses 803 in the positive pulse output 815. Since the number of positive pulses 803 is decreased, the positive pulse train in the positive pulse output 815 is decreased and this decreases the number of positive micropulses 801 in the HV output which is the ionization waveform 814 that is applied to the emitter points 102.

The following example is directed to achieving an ion balance in the blower 100 when the amount of negative ions exceeds the amount of positive ions in the blower.

If the sensor 101 and/or sensor 204 detects an ion imbalance in the ionizing blower 101 where the amount negative ions exceed the amount of positive ions in the blower 101, the balance signal 252 into the microcontroller 201 will indicate this ion imbalance. The microcontroller 201 will lengthen the positive pulse width 812 of positive pulses 803. Since the width 810 is lengthened, the amplitude of the positive micropulses 801 is increased. The increased amplitude of the positive micropulses 801 will increase the positive ions generated from the emitter points 102.

Once the maximum pulse width has been reached for the positive pulse width 812, if the amount of negative ions is still exceeding the amount of positive ions in the blower 100, then the microcontroller 201 will shorten the negative pulse width 811 of negative pulses 804. Since the width 811 is shortened, the amplitude of the negative micropulses 802 is decreased. The decreased amplitude of the negative micropulses 802 will decrease the negative ions generated from the emitter points 102.

Alternatively or additionally, if the amount of negative ions exceeds the amount of positive ions in the blower 100, the microcontroller 201 will lengthen the time between positive pulses 803 by lengthening the positive Rep-Rate 812. Since the positive Rep-Rate 812 is lengthened, the time between positive micropulses 801 is also increased. As a result, the lengthened or longer positive Rep-Rate 812 will increase the time between the positive micropulses 801 which will, in turn, increase the amount of time the positive ions generated from the emitter points 102.

Once the minimum positive Rep-Rate has been reached for the positive Rep-Rate 812, if the amount of negative ions are still exceeding the amount of positive ions in the blower 100, then the microcontroller 201 will lengthen the time between negative pulses 804 by lengthening the negative Rep-Rate 813. Since the negative Rep-Rate 813 is lengthened, the time between negative micropulses 802 is also increased. As a result, the lengthened or longer negative Rep-Rate 813 will increase the time between the negative micropulses 802 which will, in turn, decrease the amount of time the negative ions generated from the emitter points 102.

Alternatively or additionally, if the amount of negative ions exceeds the amount of positive ions in the blower 100, the microcontroller 201 will increase the number of positive pulses 803 in the positive pulse output 815. The microcontroller 201 has a positive pulse counter that can be increased so as to increase the number of positive pulses 803 in the positive pulse output 815. Since the number of positive pulses 803 is increased, the positive pulse train in the positive pulse output 815 is lengthened and the number of positive micropulses 801 is increased in the HV output which is the ionization waveform 814 that is applied to the emitter points 102.

Once the maximum amount of positive pulses has been added to the positive pulse output 815, if the amount of negative ions is still exceeding the amount of positive ions in the blower 100, then the microcontroller 201 will decrease the number of negative pulses 804 in the negative pulse output 816. The microcontroller 201 has a negative pulse counter that can be decreased so as to decrease the number of negative pulses 804 in the negative pulse output 816. Since the number of negative pulses 804 is decreased, the negative pulse train is shortened in the negative pulse output 816 and the number of negative micropulses 802 is decreased in the HV output which is the ionization waveform 814 that is applied to the emitter points 102.

If the ion imbalance (which is reflected in the balance current value 252) is not significantly different from the setpoint 253, then a small adjustment in the ion imbalance may be sufficient and the microcontroller 201 can adjust the pulse widths 811 and/or 810 to achieve ion balance.

If the ion imbalance (which is reflected in the balance current value 252) is moderately different from the setpoint 253, then a moderate adjustment in the ion imbalance may be sufficient and the microcontroller 201 can adjust the Rep-Rates 813 and 812 to achieve ion balance.

If the ion imbalance (which is reflected in the balance current value 252) is significantly different from the setpoint 253, then a large adjustment in the ion imbalance may be sufficient and the microcontroller 201 can add positive and/or negative pulses in the outputs 815 and 816, respectively.

In yet another embodiment of the invention, a duration (pulse width) of at least one polarity of the micro-pulses in FIG. 8 are at least approximately 100 times shorter than a time interval between micro pulses.

In yet another embodiment of the invention, the micro-pulses in FIG. 8 are arranged in following one another groups/pulse trains and wherein one polarity pulse train comprises between approximately 2 and 16 positive ionizing pulses, and a negative pulse train comprising between approximately 2 and 16 positive ionizing pulses, with time interval between the positive and negative pulse trains that is equal to approximately 2 times the period of consecutive pulses.

Figure 3:
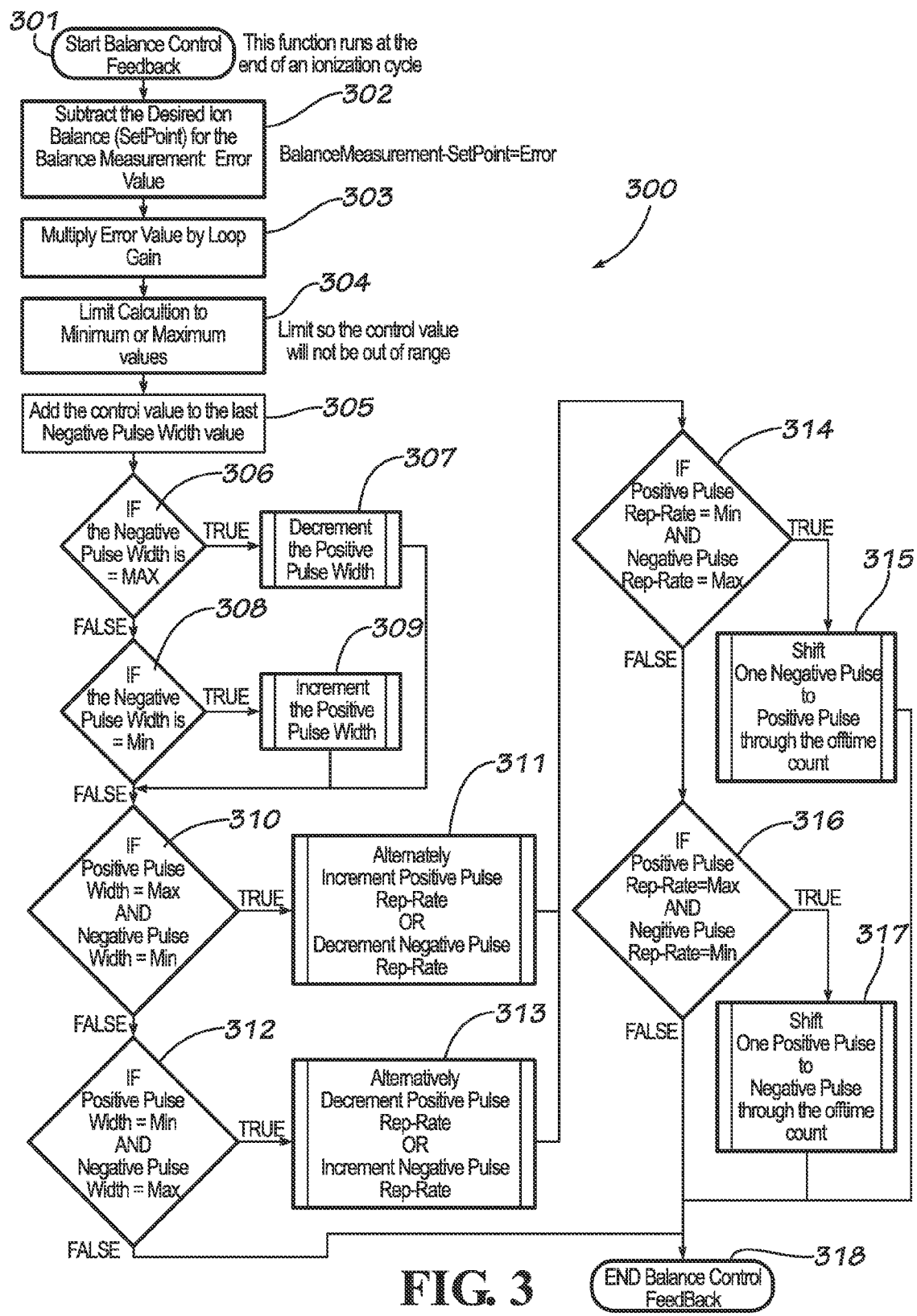
FIG. 3 is a flowchart of a feedback algorithm 300, in accordance with an embodiment of the invention.

The flowchart in FIG. 3 shows feedback algorithm 300 of the system 200, in accordance with an embodiment of the invention. The function of providing ion balance control by use of the feedback algorithm 300 runs at the end of an ionization cycle. This algorithm is performed by, for example, the system 200 in FIG. 2. In block 301, the balance control feedback algorithm is started.

In blocks 302, 303, 304, and 305, the calculation of the control value of the negative pulse width is performed. In block 302, an error value (Error) is calculated by subtracting the desired ion balance (SetPoint) from the measured ion balance (BalanceMeasurement). In block 303 the error value is multiplied by the loop gain. In block 304, the calculation of the control value is limited to minimum or maximum values so that the control value is limited and will not be out of range. In block 305, the control value is added to the last negative pulse width value.

In blocks 306, 307, 308, and 309, the pulse width is incremented or decremented. In block 306, the negative pulse width is compared with a maximum value (MAX). If the negative pulse width is equal to MAX, then in block 307, the positive pulse width is decremented and the algorithm 300 proceeds to block 310. If the negative pulse width is not equal to MAX, then the algorithm 300 proceeds to block 308.

In block 308, the negative pulse width is compared with a minimum value (MIN). If the negative pulse width is equal to MIN, then in block 309, the positive pulse width is decremented and the algorithm 300 proceeds to block 310. If the negative pulse width is not equal to MIN, then the algorithm 300 proceeds to block 310. When the negative pulse width hits its control limit, a change in the Positive pulse width will shift the balance in such a way as to over shoot the balance setpoint, forcing the Negative pulse to its limit.

In blocks 310, 311, 312, and 313, the pulse repetition rates (Rep-Rates) are incremented or decremented when pulse width limits are met. In block 310, the positive pulse width is compared with MAX and the negative pulse width is compared with MIN. If the positive pulse width is equal to MAX and the negative pulse width is equal to MIN, then in block 311, alternately, the positive pulse repetition rate (Rep-Rate) is incremented OR the negative pulse Rep-rate is decremented. The algorithm 300 proceeds to block 314. If the positive pulse width is not equal to MAX and the negative pulse width is not equal to MIN, then the algorithm 300 proceeds to block 312.

In block 312, the positive pulse width is compared with MIN and the negative pulse width is compared with MAX. If the positive pulse width is equal to MIN and the negative pulse width is equal to MAX, then in block 313, alternately, the positive pulse repetition rate (Rep-Rate) is decremented OR the negative pulse Rep-rate is incremented. The algorithm 300 proceeds to block 314. If the positive pulse width is not equal to MIN and the negative pulse width is not equal to MAX, then the algorithm 300 proceeds to block 314.

The Positive and Negative Pulse width control is used when the balance is close to the setpoint. As the emitter points age or as the environment dictates, the Positive and Negative Pulse width control will not have the range and will "Hit" is control limit (Positive at its Maximum and Negative at its Minimum (or vice versa)). When this happens the algorithm changes the Positive or Negative Rep-Rate, effectively increasing or decreasing the amount of On-Time of the Positive or Negative ion generation and shifts the balance toward the setpoint.

In blocks 314, 315, 316, and 317, the pulse repetition rates (Rep-Rates) are incremented or decremented when pulse width limits are met. In block 314, the positive pulse Rep-Rate is compared with a minimum pulse repetition rate value (MIN-Rep-Rate) and the negative pulse Rep-Rate is compared with a maximum pulse repetition rate value (MAX-Rep-Rate). If the positive pulse Rep-Rate is equal to MIN-Rep-Rate AND the negative pulse Rep-Rate is equal to MAX-Rep-Rate, then in block 315, one negative pulse is shifted to a positive pulse through an offtime count, and the algorithm 300 then proceeds to block 318 during which the balance control feedback algorithm 300 ends. An offtime count is when the ionization waveform is off. The off-time is the time between negative and positive and positive and negative group (or train of pulses) of pulses and is defined here as a count, equal to a pulse duration with a Positive or Negative Rep-Rate.

If the positive pulse Rep-Rate is not equal to MIN-Rep-Rate AND the negative pulse Rep-Rate is not equal to MAX-Rep-Rate, then the algorithm 300 proceeds to block 316.

In block 316, the positive pulse Rep-Rate is compared with MAX-Rep-Rate and the negative pulse Rep-Rate is compared with MIN-Rep-Rate). If the positive pulse Rep-Rate is equal to MAX-Rep-Rate AND the negative pulse Rep-Rate is equal to MIN-Rep-Rate, then in block 317, one positive pulse is shifted to a negative pulse through an offtime count, and the algorithm 300 then proceeds to block 318 during which the balance control feedback algorithm 300 ends. If the positive pulse Rep-Rate is not equal to MAX-Rep-Rate AND the negative pulse Rep-Rate is not equal to MIN-Rep-Rate, then the algorithm 300 proceeds to block 318 during which the algorithm 300 ends.

When the Rep-Rate control hits the limit, the algorithm triggers the next adjustment control level.

Shifting a micro pulse from Positive pulse group to Off-Time pulse group to Negative pulse group, shifts the balance in the Negative direction. Conversely, shifting a micro pulse from Negative pulse group to Off-Time pulse group to Positive pulse group, shifts the balance in the positive direction. Using the Off-Time group reduces the effect, and thus provides a finer control.

Figure 4:
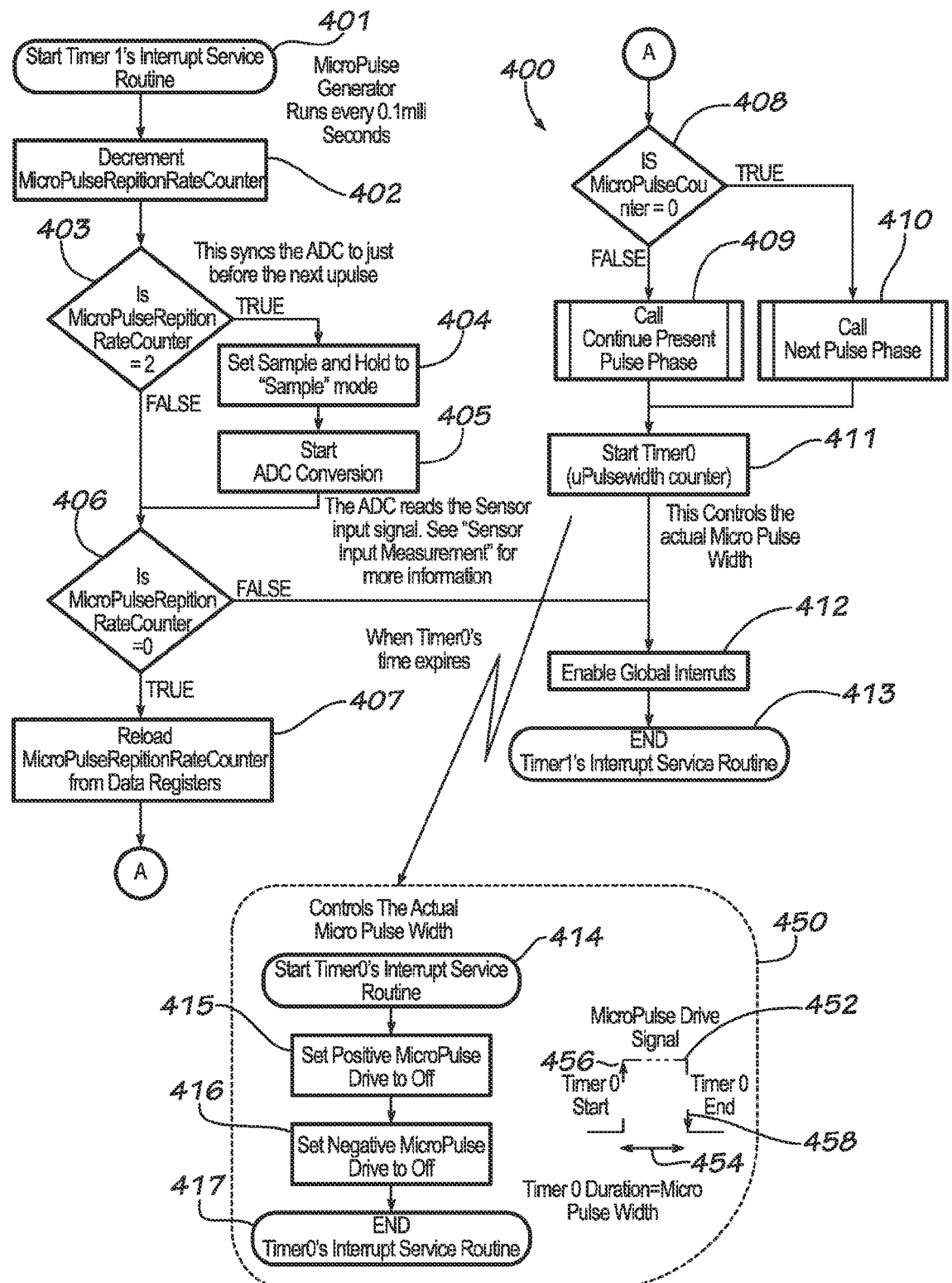
FIG. 4 is a flowchart of a micropulse generator algorithm of a micropulse generator control, in accordance with an embodiment of the invention.

A flowchart in FIG. 4 shows an algorithm 400 of a micropulse generator control. Waveforms of driving pulses and a high voltage output illustrated in the diagram of FIG. 8. This algorithm 400 is performed by, for example, the system 200 in FIG. 2. In block 401, an interrupt service routine of Timer1 is started. The algorithm 400 for the micropulse generator runs, for example, every 0.1 milliseconds.

In block 402, a micropulse repetition rate counter is decremented. This counter is the repetition rate divider counter of Timer1. Timer1 is the main loop timer and pulse control timer running at 0.1 ms. Timer1 turns on the HVPS output, thus the start of the micro pulse, where Timer0 turns off the HVPS, ending the micro pulse. Therefore, Timer1 sets the rep-rate and triggers the Analog to digital conversion, Timer0 set the micro pulse width.

In block 403, a comparison is performed if the micropulse repetition rate counter is equal to 2. In other words, a test is performed to determine if the Rep-Rate divider count is 2 count from the start of the next micropulse. The step in block 403 will synchronize the ADC (in the microcontroller 201) to a time just before the next micropulse transmission. If the micropulse repetition rate counter is equal to 2, then the sample and hold circuit 205 is set to sample mode as shown in block 404. In block 405, the ADC in the microcontroller 201 reads the sensor input signal from the sample and hold circuit 205.

If the micropulse repetition rate counter is not equal to 2, then the algorithm 400 proceeds to block 406.

Blocks 404 and 405 starts and performs the Analog-to-Digital conversion to permit the microcontroller 201 to measure the analog input received from the sample and hold circuit 205.

When the sample and hold circuit 205 is enabled, typically at approximately 0.2 milliseconds before the next micropulse occurs at block 403 with the micropulses 803 and 804 having pulse widths 810 and 811, respectively, the signal 250 (FIG. 2) is then conditioned by the low pass filter 206 and amplified by amplifier 207 before being applied to the input of the Analog to Digital Converter (ADC) residing inside the Microcontroller 201. Just after the sample and hold circuit 205 is enabling (block 404) a sample and hold operation, the ADC is signaled to start a conversion (block 405). The resulting sample rate of the balance signal is typically about 1.0 millisecond, and in synchronization with the micropulse repetition rates (rep-rate). However, the actual sample rate varies as rep-rate 812, 813 (FIG. 8) varies (as shown in blocks 310, 311, 312, 313) but will always remain in synchronization with the micropulse rep-rate 812, 813.

According to this embodiment, the method of signal sampling before the next micropulse allows the system 200 to ignore noise and current surges (capacitive coupled) and advantageously avoid corrupting the ion balance measurement.

In block 406, a test is performed to determine if the Rep-Rate divider counter of Timer1 s ready to begin the next micropulse. A comparison is performed if the micropulse repetition rate counter is equal to zero. If the micropulse repetition rate counter is not equal to zero, then the algorithm 400 proceeds to block 412. If the micropulse repetition rate counter is equal to zero, then the algorithm 400 proceeds to block 417.

In block 417, the micropulse repetition rate counter is reloaded from data registers. This will reload the time interval for the start of the next pulse (micropulse). The algorithm 400 then proceeds to block 408.

Blocks 408, 409, and 410 provide steps that determine if a new Pulse Phase is started or to continue the current Pulse Phase.

In block 408, a comparison is performed if the micropulse counter is equal to zero (0).

If so, then the algorithm 400 proceeds to block 410 which calls the next pulse phase, and the algorithm 400 proceeds to block 411.

If not, then the algorithm 400 proceeds to block 409 which calls to continue the present pulse phase.

In block 411, the Timer0 (micropulse width counter) is started. The Timer0 controls the micropulse width, as discussed below with reference to blocks 414-417.

In block 412, all system interrupts are enabled. In block 413, the interrupt service routine of Timer1 is ended.

When the Timer0 time expires, the actual micropulse width is controlled based on blocks 414-417. In block 414, the interrupt service routine of Timer0 is started. In block 415, the positive micropulse drive is set to off (i.e., the positive micropulses are turned off). In block 416, the negative micropulse drive is set to off (i.e., the negative micropulses are turned off). In block 417, the interrupt service routine of Timer0 is ended.

As also shown in portion 450 in FIG. 400, for a micropulse drive signal 452, the duration of Timer0 is equal to the micropulse width 454 of micropulse drive signal 452. The micropulse width 454 begins at pulse rising edge 456 (which is triggered at the start of the Timer0) and ends at the pulse falling edge 458 which is triggered at the end of the Timer0).

Figure 7:
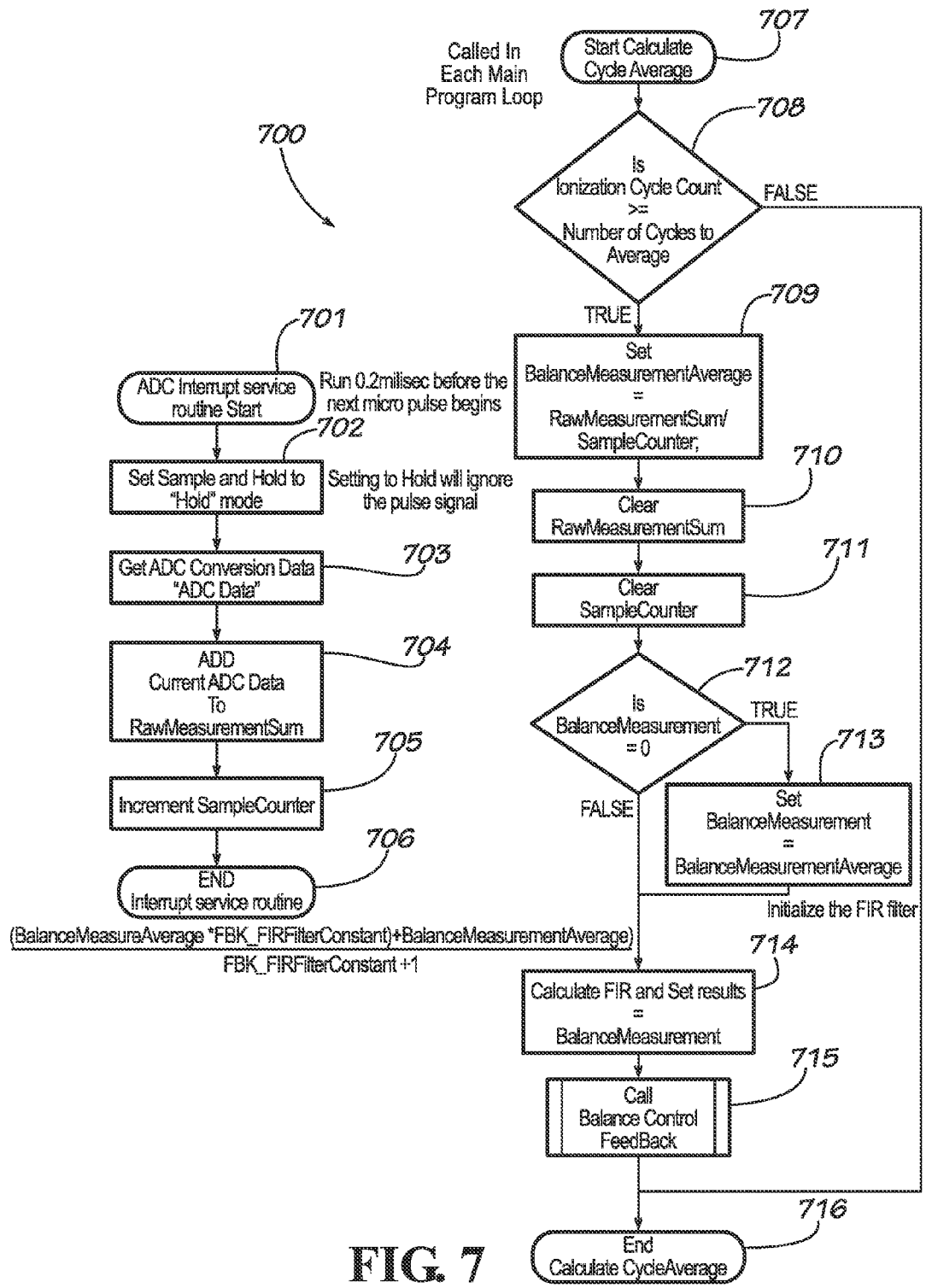
FIG. 7 is a flowchart of a system operation during the sensor input measurement, in accordance with an embodiment of the invention.

Details of a method 700 of averaging the ion balance sensor input are shown in flowchart in FIG. 7. Blocks 701-706 describes the operations of the sample and hold circuit 205 and ADC conversion of data from the sample and hold circuit 205. At the end of the ADC conversion 701, about 0.1 milliseconds later, the sample and hold block 205 is disabled, preventing the noise and current surges from corrupting the balance measurement. The resulting measurement 703 and Sample Counter 705 are added to the previous Raw Measurement Sum 704 value and saved, waiting further processing. Blocks 707-716 is an averaging routine for averaging the measurements of the sensors 101 and/or 204 and obtains an Ion Balance Measurement Average that is then combined using a Finite Impulse Response calculation to combine the Balance Measurement Average with previous measurements 714 yielding the a final Balance Measurement used in the balance control loop. The calculation in block 714 calculates a weighted average from a previous series of sensor input measurements. In block 715, an event routine is called to make an adjustment on the ion generation based on the calculation in block 714.

Figure 5A:
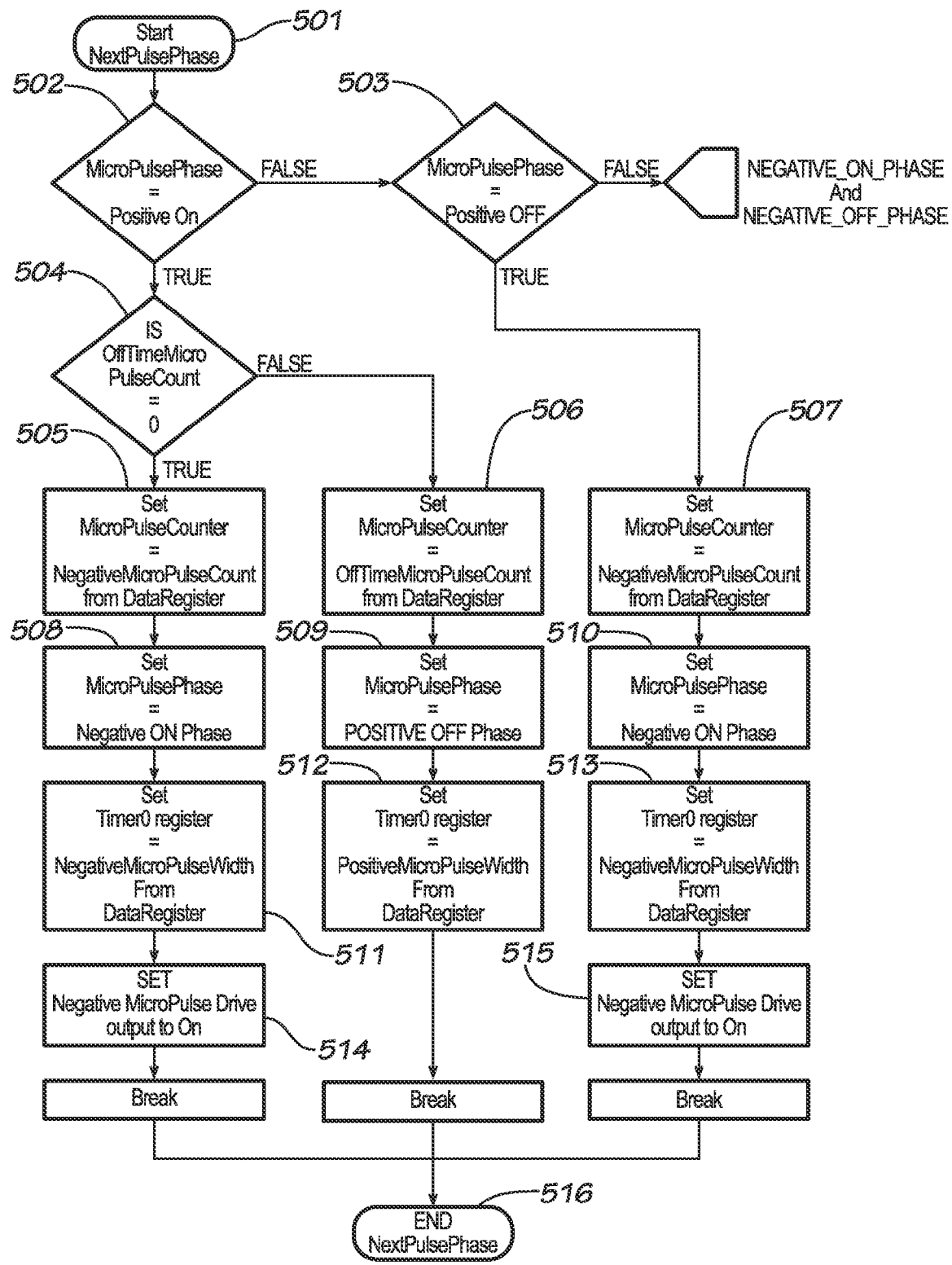
FIG. 5A is a flowchart of a system operation during the formation of a negative pulse train, in accordance with an embodiment of the invention.
Figure 5B:
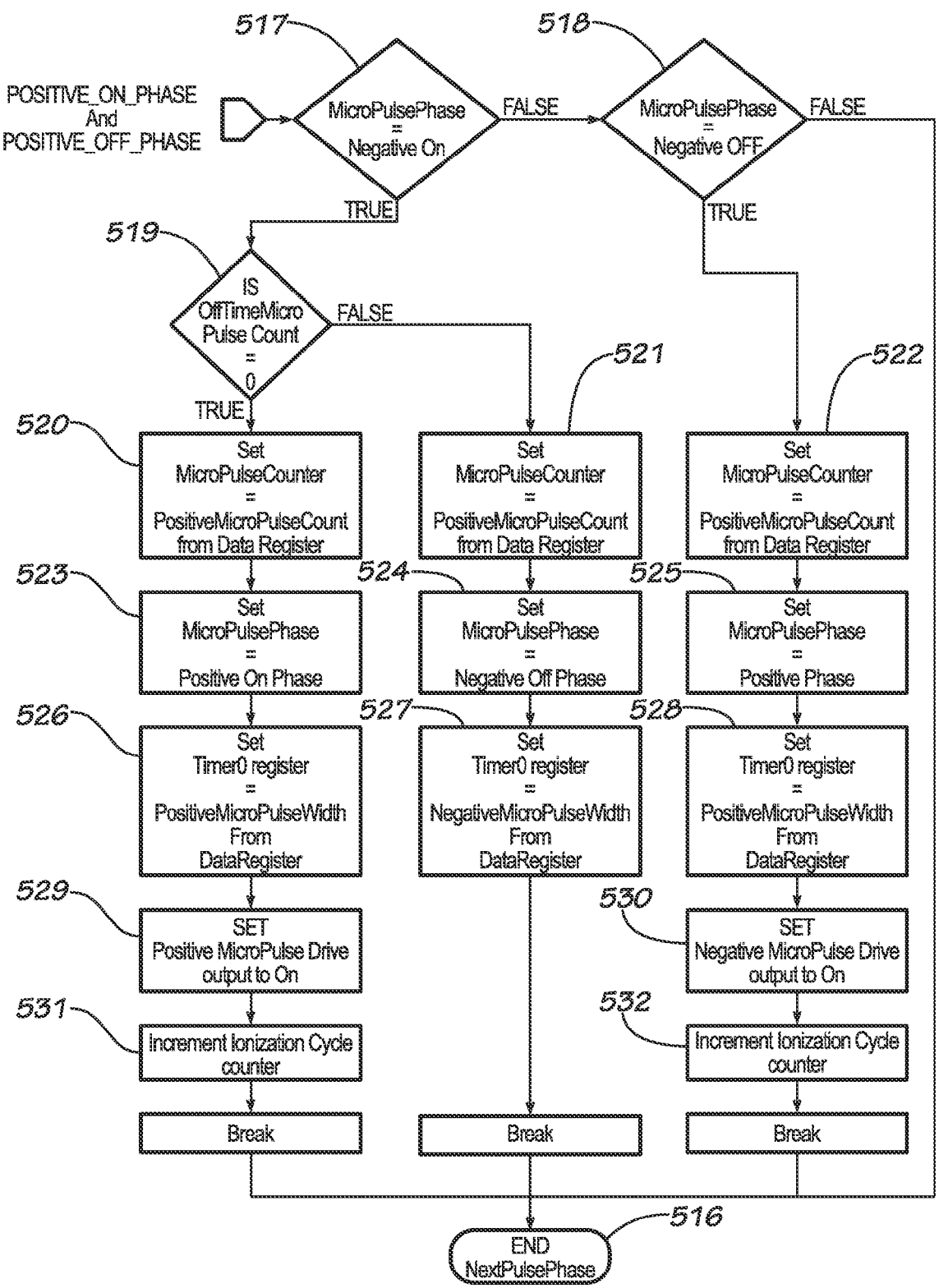
FIG. 5B is a flowchart of a system operation during the formation of a positive pulse train, in accordance with an embodiment of the invention.
Figure 6:
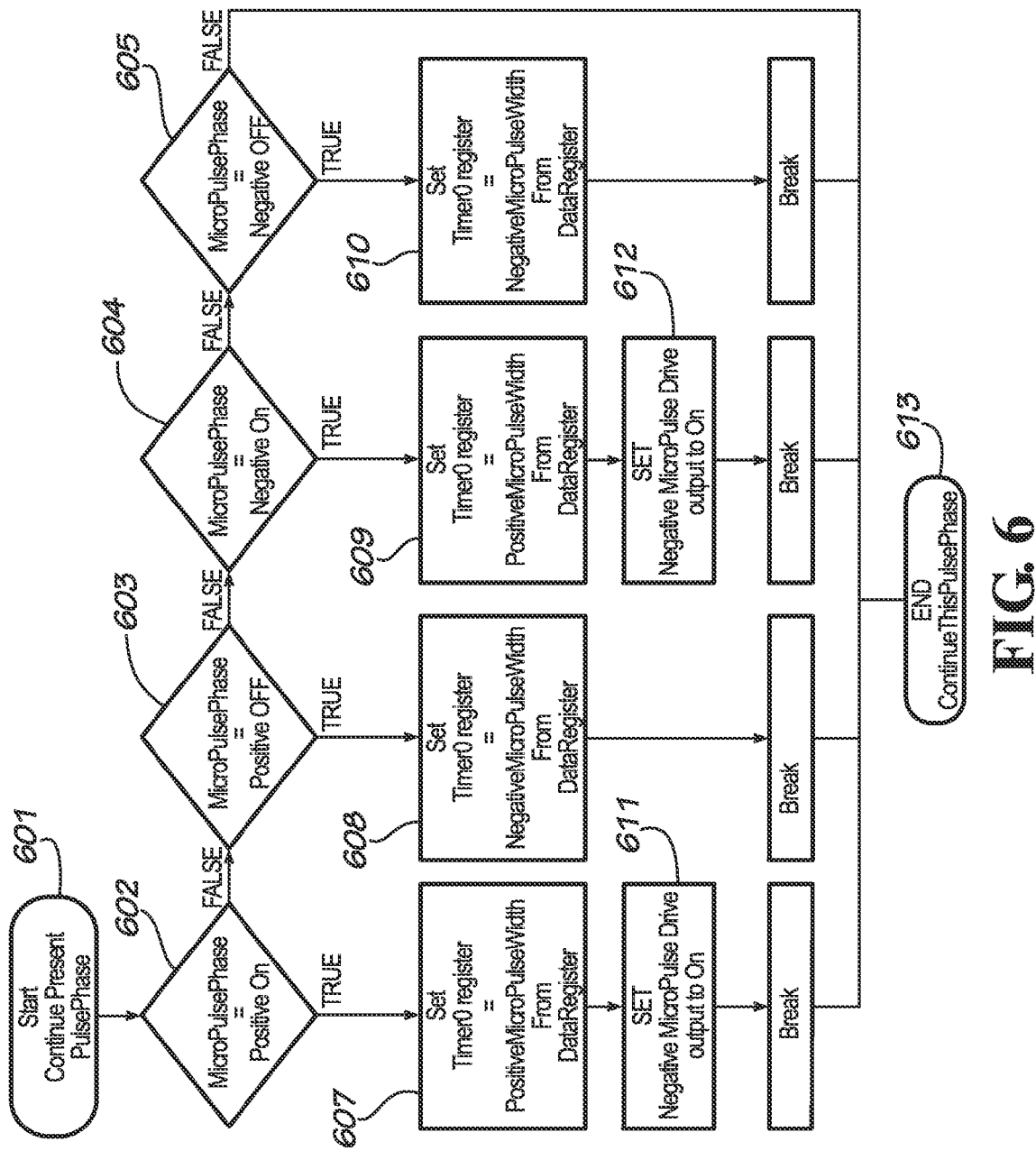
FIG. 6 is a flowchart of a system operation during a present pulse phase, in accordance with an embodiment of the invention.

The flowcharts in FIGS. 5A, 5B, and FIG. 6 illustrate system operation during formation of negative and positive polarity pulse trains. An Ionization cycle 531 is comprised of a series of positive pulses 502, 602, followed by an off time interval 503, 603, followed by a series of negative pulses 517, 604 followed by an off time interval 518, 605. When the specified number of Ionization cycles has occurred 708, the Ion Balance Measurement Average is calculated 709, and the Raw Measurement Sum 710 and Sample Counter values are cleared 710, 711.

Reference is now made to FIGS. 5A, 5B, and 6. These figures are flowcharts of a system operation during the formation of a negative pulse train and a positive pulse train, respectively in accordance with an embodiment of the invention. In block 501, the routine of the next pulse phase for a negative pulse train is started. Blocks 502-515 describe the steps for generating negative series of pulses and the off time of the pulse duration. Blocks 517-532 describe the steps for generating positive series of pulses and the off time of the pulse duration. Blocks 601-613 describe the steps for generating the next pulse phase or if the present pulse phase continues.

The Balance Measurement Average is then combined using a Finite Impulse Response calculation to combine the Balance Measurement Average with previous measurements 714 yielding the a final Balance Measurement used in the balance control loop.

The balance control loop 301 compares the Balance Measurement to the set point value 302 yielding an error value. The Error signal is multiplied by the loop gain 303, checked for over/under range 304 and added to the present Negative Pulse Width value.

In the micropulse HV supply system 202, 203, the pulse width of the driving micropulse, changes the peak amplitude of the resulting High Voltage (HV) wave 814, 801, 802. In this case the negative pulse amplitude is change to effect a change in the Ion Balance. If the error signal value is greater than zero, the Negative pulse width is adjusted up, thus increasing the negative HV pulse amplitude as a result, changing the balance in the negative direction. Conversely, if the balance is negative, the Negative pulse width is adjusted down, thus changing the balance in the positive direction.

During continual adjustments of the Negative pulse width and as conditions warrant, the Negative pulse width may hit its control limit. In this situation the Positive pulse width is adjusted down 307 for a positive out-of-balance or up 309 for a negative out-of-balance until the Negative pulse width can again resume control. This method of control using the Negative and Positive pulse width yields an average balance control adjustment range of approximately 10V with a stability of less than 3V.

According to another embodiment under large out-of-balance conditions, for instance at the Ionizing blower start up, significant contamination builds up or erosion of the emitter(s) as the they ages, the Negative pulse width and the Positive pulse width will reach their control limits 310, 312. In this situation, the Positive pulse repetition rate and the Negative pulse repetition rate are adjusted 311, 313 to bring the balance to the point where the Positive pulse width and Negative pulse width are once again in their respective control ranges. Therefore, for a large positive out-of-balance condition the Negative pulse repetition rate is increased 313, resulting in a negative shift in balance. If the condition still exists, the Positive pulse repetition rate is decreased 313, also resulting in a negative shift in balance. This alternating method of changing the Positive/Negative rep-rate 313 continues until the Negative pulse width and the Positive pulse width are once again within their control ranges. Likewise, for a for a large negative out-of-balance condition the Positive pulse repetition rate is increase 311 alternately the Negative pulse repetition rate is decreased 311 resulting in a positive shift in balance. This continues, as before, until the Negative pulse width and the Positive pulse width are once again within their control ranges.

In the case where an extreme out-of-balance condition exists, the both the Negative/Positive pulse width and Positive/Negative rep-rates adjustments may have hit their respective control limits 310, 312 314, 316, the Positive pulse count and the Negative pulse count will then be changed to bring the balance to a point where the Positive/Negative rep-rates are once again within their respective control ranges. Therefore, for an extreme positive out-of-balance condition the Positive pulse count will decrease 317 and the Off-time Pulse Count 317 will be increased by one pulse count, resulting in a negative change in balance.

If the condition is still exists, the Off-time Pulse count will be decreased 317 and the Negative pulse count will increase 317 by one pulse count, resulting in a further negative change in balance. This shifting of one pulse from negative to positive packets/trains continues until the Positive/Negative rep-rate is once again within their control ranges. Likewise, for a for an extreme negative out-of-balance condition one pulse at a time will be shift from the positive pulse 315 packet/train through the off-time pulse count to the negative pulse packet 315 resulting in a positive change in balance until the Positive/Negative rep-rate are once again within their control ranges.

In a parallel process, the Balance Measurement is compared to the setpoint. If the Balance Measurement is determine to be outside its specified range, corresponding to an average CPM (Charge plate monitor) reading of +/−15V measured at 1 foot from the ionizer, the control system of the Ionizer will trigger a balance alarm.

Figure 9:
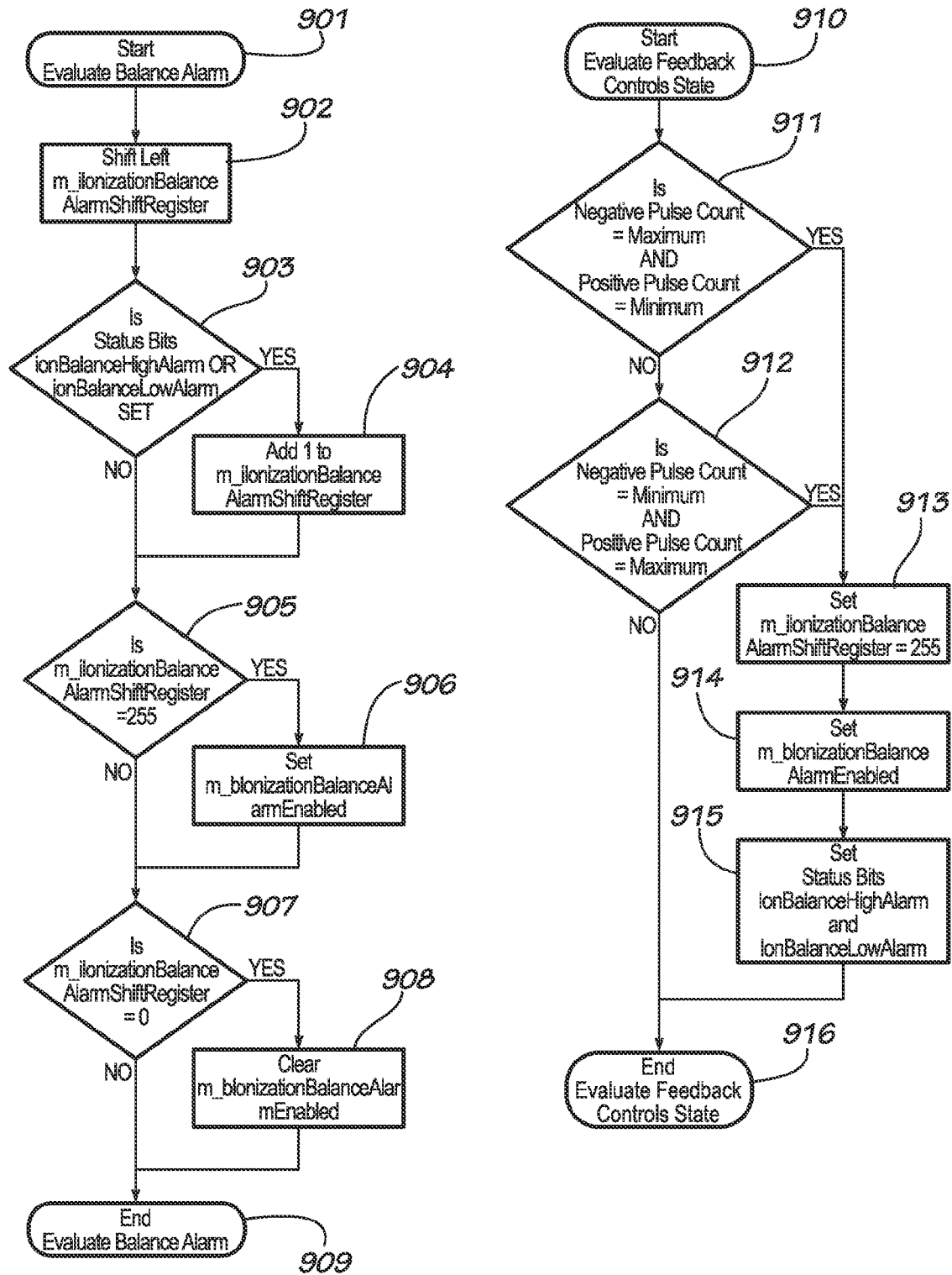
FIG. 9 is a flowchart of a system operation during a balance alarm, in accordance with an embodiment of the invention.

In FIG. 9 is method for providing a feedback routine that actuates an ion balance alarm if an ion imbalance is present. Blocks 901-909 performs measurements that are compared with threshold values to determine if a balance alarm is actuated. Blocks 910-916 determines if a balance alarm is actuated In a timed interval of once every 5 second, the Balance Measurement is evaluated 903, when outside this range a "1" is left shifted into the Alarm register 904 otherwise a "0" left shifted into the Alarm register 902. When the Alarm register contains a value of 255 (all "1"s) the Balance Measurement is declared in alarm. Likewise if the Alarm register contains a value of 0 (all "0"s) the Balance Measurement is declared not in alarm. Any value of the Alarm register not 255 or 0 is ignored and the state of the alarm is unchanged. This filters the Alarm notification and prevents sporadic notifications. As a byproduct, the notification delay allows sufficient time for the Balance control system to recover from external stimulus.

In another parallel process running at the end of each ADC conversion cycle, about every 1 milli-second FIG. 9B, the balance control system is monitored. This routine 910 checks the Positive and Negative pulse counts for limit condition 911, 912. As stated above, when an out-of-balance condition exists and the Positive/Negative pulse width and the Positive/Negative rep-rate are at their respective limits, the Positive and Negative pulse counts are adjusted. However in the event the Balance cannot be brought back into the specification the and the Positive/Negative pulse counts have reached their adjustment limit 911 912, an alarm state is force by setting the Alarm register to a value of all "1"s 913, setting the Alarm flag 914, and setting both alarm status bits 915.

The method and technic of automatic balance control discussed above is not limited to one type of ionizing blower. They can be used in different models of ionizing blowers with variety emitter electrodes. Other applications of the automatic system include models of ionizing bars with micro-pulse high voltage power supplies.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of automatically balancing ionized air stream created in bipolar corona discharge, the method comprising:
   providing an air moving device with at least one ion emitter and at least one reference electrode connected to a micro-pulsed AC (Alternating Current) power source, and a control system with at least one ion balance monitor and a corona discharge adjustment control;
   generating variable polarity groups of short duration ionizing micro-pulses:
   wherein said micro-pulses are predominantly asymmetric in amplitude and in duration of both polarity voltages and have a magnitude of at least one of polarity ionizing pulses exceeding a corona threshold.

2. A method of claim 1, wherein a duration of at least one polarity of said micro-pulses is at least approximately 100 times shorter than a time interval between micro pulses.

3. A method of claim wherein said micro-pulses are arranged in following one another in groups/pulse trains and wherein one polarity pulse train comprises between approximately 2 and 16 positive ionizing pulses; and a negative pulse train comprises between approximately 2 and 16 positive ionizing pulses, with a time in between the positive and negative pulse trains that is equal to approximately 2 times the period of consecutive pulses.

4. A method of claim 1, wherein to balance an ionized air stream, said corona discharge adjustment control varying a number of pulses in said positive and/or negative pulse trains generated by said voltage source.

5. A method of claim 1, wherein to balance an ionized air stream, said corona discharge adjustment control varying a duration of ionizing pulses in said positive and/or negative pulse trains generated by said voltage source.

6. A method of claim 1, wherein to balance an ionized air stream said corona discharge adjustment control varying a repetition rate of ionizing pulses in said positive and/or negative pulse trains generated by said voltage source.

7. A method of claim 1, wherein said at least one ion balance monitor provides separation ions convection currents from pulsed AC currents by arranging a closed loop current path between said pulsed AC voltage source, said at least one ion emitter and said at least one reference electrode.

8. A method of claim 1, comprising: performing an ion balance monitoring during time periods between said micro-pulses.

9. A method of claim 1, comprising: performing an ion balance monitoring by integrating differential signals of said positive and negative convection currents.

10. An apparatus for an automatically balanced ionizing blower, comprising:

an air moving device, and at least one ion emitter and at least one reference electrode, said at least ion emitter and said at least one reference electrode both connected to a high voltage source; and at least one ion balance monitor;

wherein a transformer of said high voltage source, said at least one ion emitter and said at least one reference electrode are arranged in a closed loop current path for an AC (Alternating Current) current circuit and said closed loop current path is connected to ground by a high value viewing resistor;

wherein the high voltage source is configured to apply a high voltage output to said at least one ion emitter and wherein said high voltage output comprises both positive polarity and negative polarity ionizing micro-pulses.

11. An apparatus of claim 10, wherein said at least one ion balance monitor includes a high impedance voltage sensor connected to an ion balance control system and installed downstream to the at least one ion emitter at an outlet of said air moving device.

12. An apparatus of claim 10, wherein said high voltage source generates said high voltage output comprising:

variable polarity groups of short duration ionizing micro-pulses;

wherein said micro-pulses are predominantly asymmetric in amplitude and in duration of both polarity voltages and have a magnitude of at least one of polarity ionizing pulses exceeding a corona threshold.

13. An apparatus of claim 12, wherein said high voltage source generates said high voltage output comprising a duration of at least one polarity of said micro-pulses of at least approximately 100 times shorter than a time interval between micro pulses.

14. An apparatus of claim 12, wherein said micro-pulses are arranged in following one another in groups/pulse trains and wherein one polar ty pulse train comprises between approximately 2 and 16 positive ionizing pulses; and a negative pulse train comprising between approximately 2 and 16 positive ionizing pulses, with a time interval between the positive and negative pulse trains that is equal to approximately 2 times the period of consecutive pulses.

15. An apparatus of claim 10, further comprising a control system, wherein to balance an ionized air stream, said control system varying a number of pulses in said positive and/or negative pulse trains generated by said voltage source.

16. An apparatus of claim 10, further comprising a control system, wherein to balance an ionized air stream, said control system varying a duration of ionizing pulses in said positive and/or negative pulse trains generated by said voltage source.

17. An apparatus of claim 10, further comprising a control system, wherein to balance an ionized air stream said control system varying a repetition rate of ionizing pulses in said positive and/or negative pulse trains generated by said voltage source.

18. An apparatus of claim 10, wherein said at least one ion balance monitor provides separation ions convection currents from pulsed AC currents by arranging the closed loop current path between said voltage source, said at least one ion emitter and said at least one reference electrode.

19. An apparatus of claim 10, wherein said at least one ion balance monitor performs an ion balance monitoring during time periods between micro-pulses.

20. An apparatus of claim 10, wherein said at least one ion balance monitor further includes an air ionization voltage sensor comprising a louver type plate.

21. An apparatus of claim 20, wherein the louver type plate comprises an electrode on a top side of the plate and a grounded electrode on a bottom side of the plate.

* * * * *